(12) United States Patent
Bauer et al.

(10) Patent No.: US 6,607,464 B1
(45) Date of Patent: Aug. 19, 2003

(54) TRANSMISSION, ESPECIALLY FOR WIND POWER INSTALLATIONS

(75) Inventors: Gerhard Bauer, Witten (DE); Günter Berger, Castrop-Frohlinde (DE)

(73) Assignee: Lohmann + Stolterfoht GmbH, Witten (DE)

( * ) Notice: Subject to any disclaimer, the term of this patent is extended or adjusted under 35 U.S.C. 154(b) by 0 days.

(21) Appl. No.: 10/169,041

(22) PCT Filed: Nov. 10, 2000

(86) PCT No.: PCT/DE00/03966

§ 371 (c)(1),
(2), (4) Date: Jun. 21, 2002

(87) PCT Pub. No.: WO01/50038

PCT Pub. Date: Jul. 12, 2001

(30) Foreign Application Priority Data

Dec. 23, 1999 (DE) .......................................... 199 63 597

(51) Int. Cl.[7] ................................................. F16H 3/44
(52) U.S. Cl. ..................... 475/269; 475/302; 475/325; 475/248
(58) Field of Search ................................ 475/269, 286, 475/302, 317, 323, 325, 248, 249

(56) References Cited

U.S. PATENT DOCUMENTS

| | | | |
|---|---|---|---|
| 4,120,213 A | * 10/1978 | Levy | 475/53 |
| 4,357,840 A | * 11/1982 | Winzeler | 475/205 |
| 4,730,788 A | 3/1988 | Metcalf et al. | |
| 5,423,726 A | * 6/1995 | Kota et al. | 475/206 |
| 5,692,987 A | * 12/1997 | Shibahata et al. | 475/204 |
| 6,527,671 B2 | * 3/2003 | Paalasmaa et al. | 477/99 |

FOREIGN PATENT DOCUMENTS

| | | |
|---|---|---|
| DE | 1 206 254 | 12/1965 |
| DE | 28 41 330 | 3/1980 |
| WO | WO 96/11338 | 4/1996 |

OTHER PUBLICATIONS

H. Müller: "Die Umlaufgetriebe", Springer Verlag.

* cited by examiner

*Primary Examiner*—Sherry Estremsky
*Assistant Examiner*—Tisha D. Lewis
(74) *Attorney, Agent, or Firm*—Henry M. Feiereisen (57) ABSTRACT

A transmission, especially for wind power installations includes a planetary stage on the input side that is mounted upstream of at least one gear stage. The planetary stage includes at least two power-splitting planetary gears that are mounted in parallel. A differential gear that is mounted downstream of the power-splitting planetary gears compensates for an unequal load distribution between the individual planetary gears caused by their parallel disposition.

22 Claims, 4 Drawing Sheets

TRANSMISSION, ESPECIALLY FOR WIND POWER INSTALLATIONS

BACKGROUND OF THE INVENTION

The invention relates to a transmission, and more particularly to a transmission for wind power installations, with an input-side planetary stage comprised of at least two power-splitting planetary gears connected in parallel and at least one gear stage connected downstream of the planetary stage.

In a wind power installation, a transmission with a geared-up transmission ratio is typically installed in the force flux between a rotor, which transforms the wind energy into a rotary motion, and a generator, which transforms the rotary motion into electrical energy. It is highly desirable to have lightweight transmissions with the smallest possible dimensions, since the various modules of the wind power installation are primarily housed inside a capsule located on top of a tower. This requirement is in conflict with the trend to increasingly more powerful wind power installations, which then also require more efficient, i.e., heavier transmissions.

A lightweight transmission with a corresponding small size is known from WO 96/11338. The small weight-saving construction is realized by connecting two planetary gear stages in series. The planet carrier of the first input-side planet gear is connected to the rotor and forms the drive shaft for the gear. The hollow wheel of the first planetary gear is secured to the case, whereas the driven sun wheel is connected to an input-side planet carrier of the second planetary gear, whose hollow wheel is also secured to the case and whose sun wheel forms the driven (output) section of the entire gear. However, this series connection of two planetary gear stages, has the disadvantage that for larger size wind power installations—in particular above 2 MW—the outside dimension of the transmission are too large even when a planetary gear arrangement is used. Simultaneously, the mass also reaches a critical value.

An alternative type of conventional transmissions of the type of interest has a input-side planetary gear stage, which is connected to the rotor. Unlike the conventional transmission with a second planetary gear stage described above, at least one gear stage with spur wheels is connected downstream which provides an additional up-conversion of the rotation speed of the rotor to the faster rotation speed desired for the generator. Due to the torque-rotation speed conditions, the input-side planetary gear stage in this design also determines the geometric dimensions of the entire gear, so that the problems caused by the large size and the corresponding large mass still persist.

An attempt to solve the aforedescribed problem included reducing the outside dimensions of the transmission—in particular the diameter—and simultaneously the total mass by splitting the power in the input-side gear stage. The input power can be split by dividing the input-side planetary stage into at least two smaller planetary gears that are connected in parallel. Attempts have been made to equalize the torque between the two planetary gears after splitting the power, i.e., to split the power between the two planetary gears in a defined manner, by providing the engaging gear wheels with helical gearing to compensate for relative rotation of the output-side gear components of the planetary stage. The power can be equalized by providing the parallel-connected gear wheels of the first and second planetary gears of the input-side planetary stage with helical gears oriented in opposite directions. However, it has been observed in practice, that this still causes troublesome relative movements of the planetary wheels, because the large number of engagement points of the gear wheels of the planetary gear participating in the power transmission still causes persistent relative axial movements. This is caused primarily by manufacturing tolerances in the gear wheels. It is therefore difficult to achieve a satisfactory torque equalization in the planetary stage where the power is split.

SUMMARY OF THE INVENTION

It is therefore an object of the present invention to improve a power-splitting gear of the aforedescribed type, so that the torque can be precisely balanced even when using small lightweight gears.

According to one aspect of the invention, differential gear stage is connected downstream of the power-splitting planetary gears of a input-side planetary stage, so as to balance the load that was unequally split between the planetary gears as a consequence of the parallel connection.

Advantageously, the planetary stage includes exactly two planetary gears which are connected in parallel and arranged sequentially. This arrangement guarantees an effective power flux with a reasonable number of gear elements.

Advantageously, with this arrangement of the differential gear stage downstream of the input-side planetary stage, any relative movement of the gear elements due to manufacturing tolerances can be precisely neutralized. The differential gear stage equalizes a torque imbalance between the preferable two driven shafts of the planetary stage so as equally split the power. Even a smaller gear can then be operated with a defined power splitting, as implemented with the parallel connection of the power-splitting planetary gears of the input side planetary stage.

According to an improved embodiment of the invention, a sun shaft of the first planetary gear together with a sun shaft of the second planetary gear forms a coaxial hollow shaft assembly. The two planetary gears of the input side planetary stage can then also be positioned in coaxial disposition. On the output side, the corresponding sun wheels can also be arranged in coaxial and space-saving disposition.

The driven shaft of the gear can preferably be positioned with an axial offset from the drive shaft by using a spur gear stage, whereby means for controlling the rotor can be guided through a hollow drive shaft.

In a first preferred embodiment of the invention, the differential gear stage is formed as a so-called "passive differential" in the form of a differential planetary gear. The differential planetary gear splits the power equally between the two connected sun shafts of the symmetric planetary stage formed of planetary gears having equal dimensions. One sun shaft is hereby operatively connected with this sun wheel, whereas the other sun shaft is operatively connected with the hollow wheel of the differential gear stage. The planet carrier forms the driven (output) section. The passive differential gear stage can be arranged either coaxially with the sun shafts or with an axial offset from the sun shafts by way of an intermediate spur gear stage. The role of the passive differential in form of a differential planetary gear is to equalize the torque between the two planetary gears of the input-side planetary stage. Since the two planetary gears are constructed in an identical fashion, this embodiment is easy to manufacture and the replacement parts inventory can be kept low.

In a second preferred embodiment, the differential gear stage is formed as a so-called "active differential" in the form of a differential planetary gear. On one hand, the active differential splits the power equally between the two connected sun wheels of the planetary stage that is comprised of planetary gears with identical dimensions; on the other hand, the differential gear stage contributes to the overall transmission ratio of the gear through an asymmetric connection of the planetary gears of the planet stage, which will be described in more detail below. Because the active differential not only compensates the torque, but also contributes to the gear ratio of the gear, the size of the first planetary stage can be smaller than in the first embodiment, While still realizing the same gear ratio of the gear. Advantageously, integrating the functions of a differential with those of a gear also reduces the number of gear elements which in turn reduces the mass of the entire gear. This advantage is achieved primarily by the asymmetric connection of the input-side planetary stage.

According to a third embodiment of the invention, the differential gear stage can be implemented as a passive differential in form of a differential spur gear pair which is supported softly in the axial direction and has gear wheels with opposite helical gearing. Unlike the differential planetary gear according to the two preceding embodiments, the differential spur gear pair splits the power equally between the two connected sun shafts of the symmetrically constructed planetary stage that includes planetary gears having the identical dimensions. One sun shaft is operatively connected with one differential spur wheel of the spur gear pair, whereas the other sun shaft is operatively connected with the other differential spur wheel which has the opposite helical gearing. The differential spur gear pair can preferably be flexibly supported along the axial direction by a soft coupling element that is coaxially disposed between the differential spur gear pair and a coaxial spur wheel arranged on the output side. The soft coupling characteristic in the axial direction is preferably achieved with a coupling element having a body made of an elastomer.

Additional features that represent improvements of the invention are recited in the dependent claims and described in more detail hereinafter with reference to three preferred embodiment of the invention to be read in conjunction with the drawings.

DETAILED DESCRIPTION OF PREFERRED EMBODIMENTS

Figure 1:
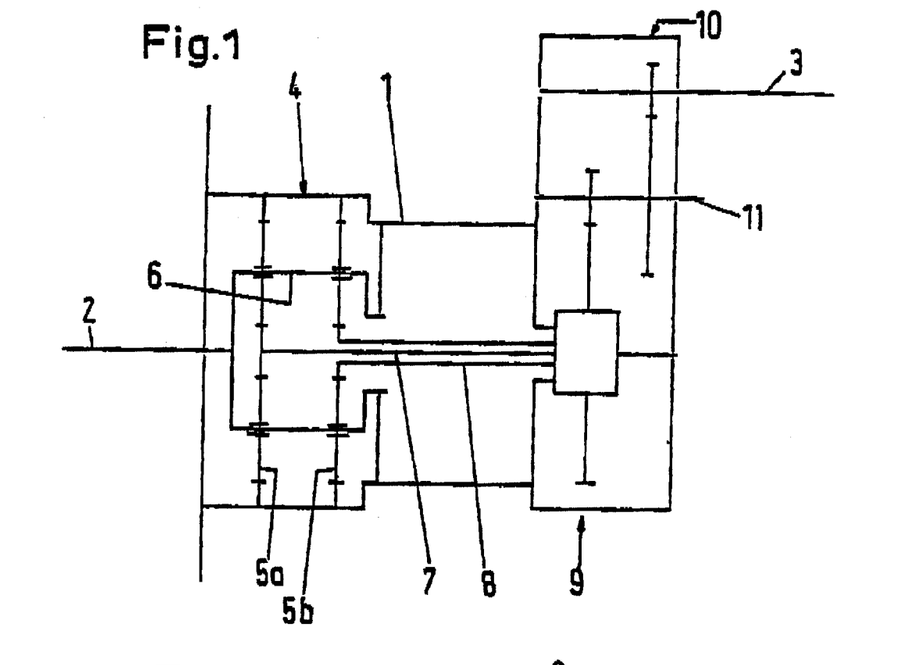
FIG. 1 is a schematic diagram of a first embodiment of a gear with a passive differential in form of a differential planetary gear in coaxial disposition with the input-side planetary stage.

The gear according to FIG. 1 has a drive shaft 2 which is rotatably supported in a case 1, with a rotor (not shown) of a wind power installation attached to the drive shaft 2. An output shaft 3, which is also rotatably supported in the case 1, provides a connection with a generator (not shown) for the production of electric energy. The drive shaft 2 is connected to an input-(drive-) side planetary stage 4. The planetary stage 4 includes two planetary gears 5a, 5b that are connected in parallel and split the power. For this purpose, the two planetary gears 5a and 5b have a common planet carrier 6, which is connected to the drive shaft 2. The two planetary gears 5a and 5b are constructed in an identical fashion. Their output section is formed by a hollow shaft arrangement wherein a sun shaft 7 of the first planetary gear 5a extends inside a hollow sun shaft 8 of the second planetary gear 5b. Both sun shafts 7 and 8 are connected to the input of a differential gear stage 9. The differential gear stage 9 is formed as a planetary gear and provides torque compensation for the planetary stage 4 connected upstream. Like with a passive differential, any imbalance in the power splitting caused by manufacturing tolerances in the two connected sun shafts 7 and 8 is evened out. The symmetric planetary gears 5a and 5b, which are constructed of identical gear elements, can then be operated load-balanced, i.e., with optimal splitting of the power flux. One sun shaft 7 is connected with the sun wheel, whereas the other sun shaft 8 is connected with the hollow wheel of the differential gear stage 9 whose planet carrier forms the output section. The differential gear stage compensates only the torque imbalance of the planetary stage 4 and does not contribute to the total gear ratio of the gear. For additional gearing-up, an additional spur wheel gear stage 10 is connected downstream of the differential gear stage 9. The spur wheel gear stage 10 also provides an arrangement where the drive shaft 3 is offset from the drive shaft 2 in the axial direction.

Figure 2:
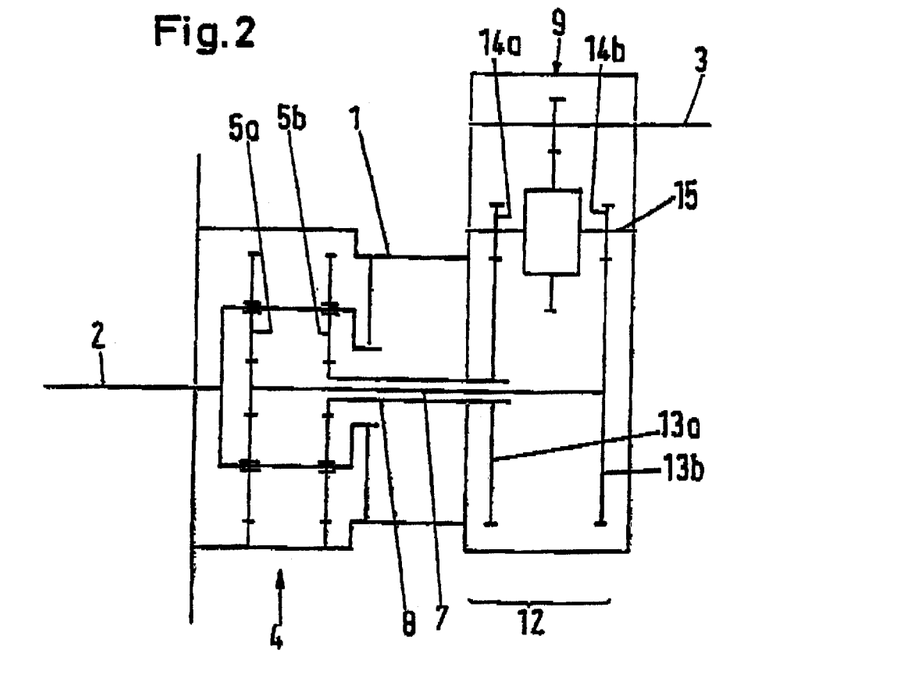
FIG. 2 is a schematic diagram of a gear according to FIG. 1, however in an axially offset disposition with respect to the input side planetary stage.

According to a modified embodiment depicted in FIG. 2, the differential gear stage 9 is arranged with an axial offset from the sun shafts 7 and 8 effected by an intermediate spur gear stage 12. The intermediate spur gear stage 12 includes two spur wheels 13a and 13b arranged side-by-side. The spur wheel 13a is hereby connected with the hollow sun shaft 8 and the spur wheel 13b with the other sun shaft 7. Both spur wheels 13a and 13b have identical dimensions and are arranged coaxially in spaced-apart disposition and engage with corresponding spur wheels 14a and 14b, which are arranged on a common intermediate shaft 15. The differential gear stage 9 is arranged coaxially between the two spur wheels 14a and 14b. One sun shaft 8 is hereby connected with the sun wheel of the differential gear stage 9 via the paired spur wheels 13a and 14a; the other sun shaft 7 is connected with the hollow wheel of the differential gear stage 9 via the paired spur wheels 13b and 14b.

Figure 3:
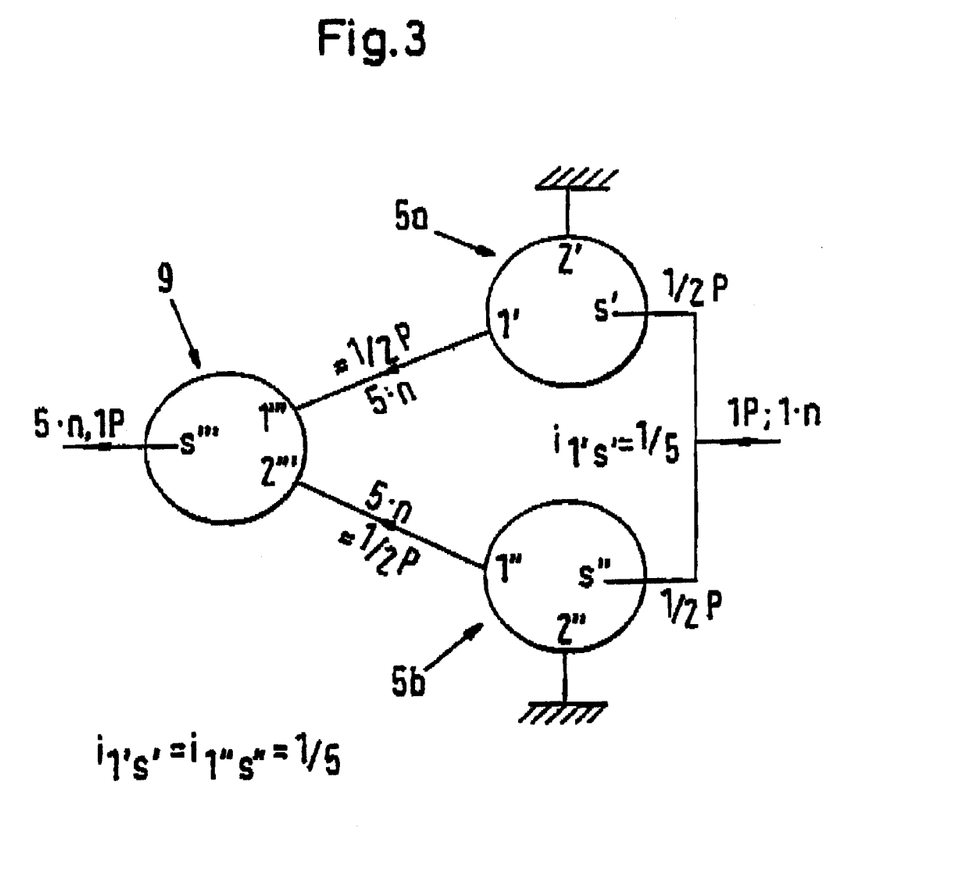
FIG. 3 is a diagram of the force flux through the gear of FIG. 1 or FIG. 2 following the Wolf symbolic notation.

The FIG. 3 uses Wolf's symbolic notation to illustrate the power flux inside the gear. The circular symbols represent the corresponding planetary gears described in the previous embodiment as follows:

one dash—planetary gear 5a two dashes—planetary gear 5b three dashes—differential gear stage 9

The reference symbols inside the circular symbols are associated with the following connections of a planetary gear:

1—sun wheel

2—hollow wheel s—planet carrier

The symbolic notation illustrates the operation of the gear described above with reference to the first embodiment. The input-side power is split in half by the planetary gears 5a and 5b that are connected in parallel and hence have the same rotation speed. The differential gear stage connected downstream recombines the split power. Inside the planetary gears 5a and 5b that are connected in parallel, the rotation speed is geared up by ⅕. By splitting the power, the diameter of the planetary gears 5a and 5b can be reduced which also decreases the mass of the entire gear.

Figure 4:
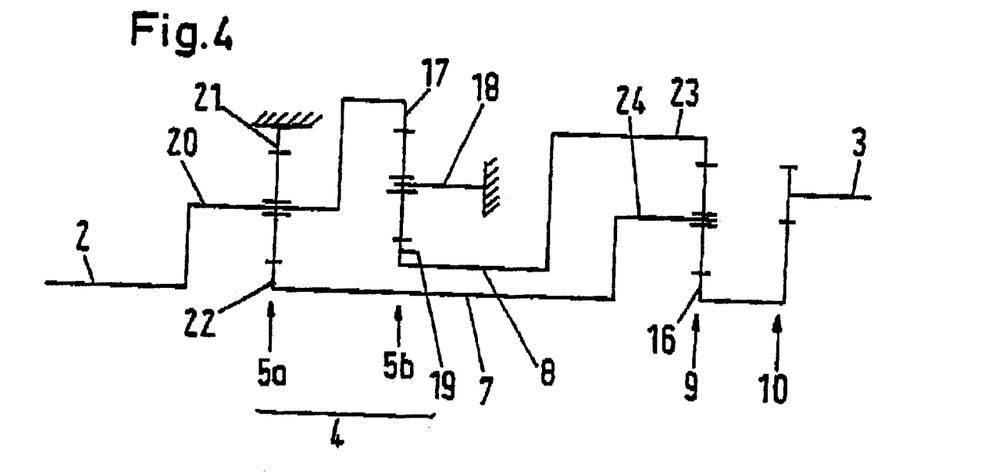
FIG. 4 is a schematic diagram of a second embodiment of a gear with an active differential in form of a differential planetary gear.

The half cross-section of FIG. 4 represents a second embodiment of the invention implemented as a gear with an active differential that is also a planetary gear. The existing differential gear stage 9 is connected downstream of two planetary gears 5a and 5b which have identical dimensions and hence split the power approximately in half. However, unlike the previously described embodiment, the two planetary gears 5a and 5b which form the input-side planetary stage 4 that is connected with the drive shaft 2, are asymmetrically connected. As a result, the differential gear stage 9 equalizes not only the torque difference between the two connected sun shafts 7 and 8, but—due to the asymmetric connection of the planetary stage 4—also contributes to the total gear ratio of the gear. In this case, the planet carrier 6 is not common to both planetary gears 5a and 5b. In the asymmetric connection of the planetary stage 4 with the differential gear stage 9, the hollow wheel 17 of the planetary gear 5b is arranged on the input side with the planet carrier 18 that is secured to the case and with the output-side sun wheel 19. In the other planetary gear 5a, the planet carrier 20 on the input side is arranged with the hollow wheel 21 that is secured to the case and with the output-side sun wheel 22. One sun wheel 19 is here connected with the hollow wheel 23 of the differential gear stage 9. The power is transmitted by the hollow sun shaft 8. The other sun wheel 22 of the planetary stage 4 is connected via the sun wheel 7 with the planet carrier 24 of the differential gear stage 9. Finally, on the output side, the geared power is transmitted to the output shaft 3 via the sun wheel 16 of the differential gear stage 9 and the output-side spur gear stage 10.

Figure 5:
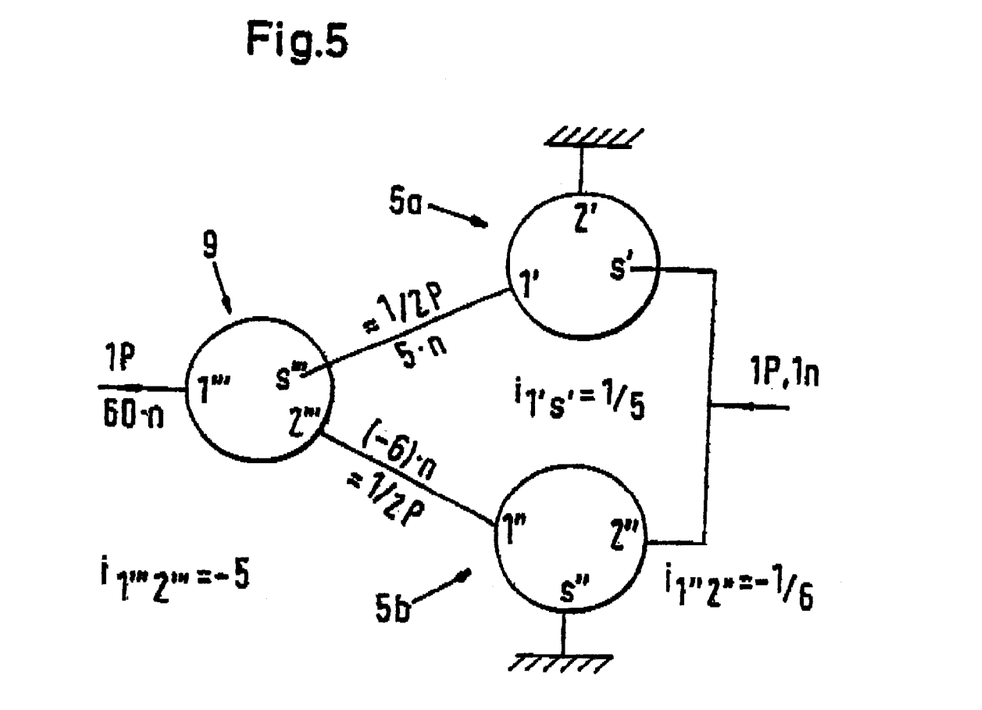
FIG. 5 is a diagram of the force flux through the gear of FIG. 4 following the Wolf symbolic notation.

As seen in FIG. 5, the aforedescribed gear with active differential also splits the power as a result of the parallel connection of the planetary gears 5a and 5b of the planetary stage 4. The aforedescribed asymmetric connection of the planetary gears 5a and 5b causes the output sides to rotate in opposite directions. The rotation speeds are also different from the rotation speed of the output side. However, with this connection, the differential gear stage 9 contributes to the total gear ratio of the gear. A total gear ratio of, for example, 1:70 can be achieved with a small number of a gear stages, i.e., a small number of gear wheels, which again reduces the mass.

Figure 6:
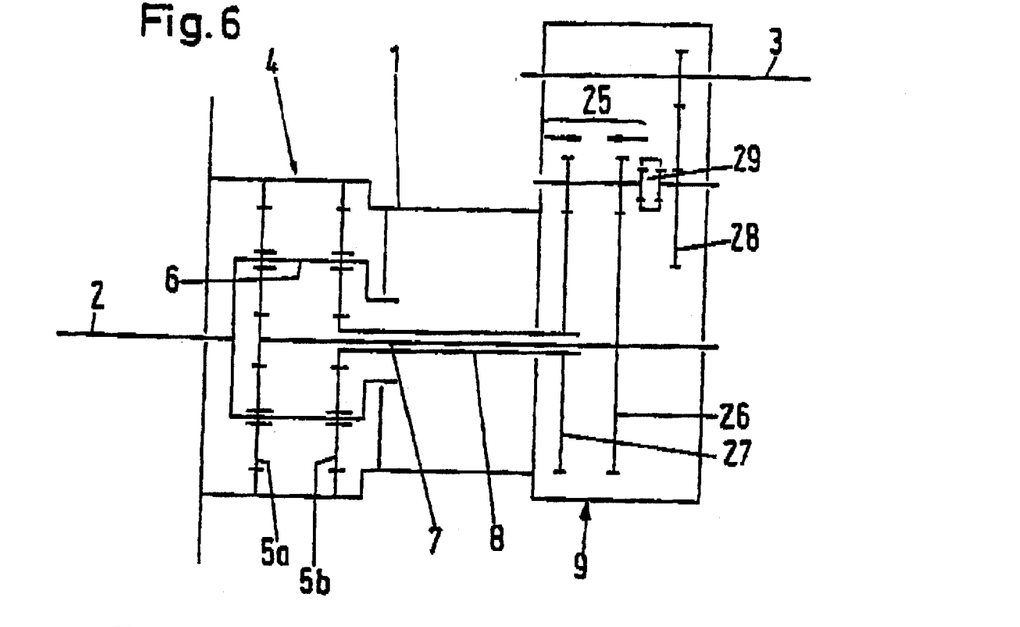
FIG. 6 is a schematic diagram of a third embodiment of a gear with an active differential in form of a differential spur gear pair in combination with an axially soft coupling.

The third embodiment depicted in FIG. 6 is constructed similar to the first embodiment. Unlike the first embodiment, however, the differential gear stage 9 is implemented as a helical gear differential spur gear pair 25. Since the differential spur gear pair 25 represents a gear stage that contributes to the total gear ratio of the gear, this differential gear stage 9 can be referred to as active differential. The differential spur gear pair 25 performs the differential gear function through an opposing helical gearing of the two spur wheels of the spur gear pair 25, which cooperates with a differential spur wheel 26 secured on the sun shaft 7 and a differential spur wheel 27 secured on the other sun shaft 8. The torque is equalized is realized through cooperation between the differential spur gear pair 25 and a soft support in the axial direction provided by an axially soft coupling 29 that is disposed coaxially between the differential spur gear pair 25 and a spur wheel 28 that is coaxially located on the output side. The axially soft coupling 29 thereby ensures a load-balancing tooth engagement within the differential spur gear pair 25 that includes the differential spur wheels 26 and 27.

Figure 7:
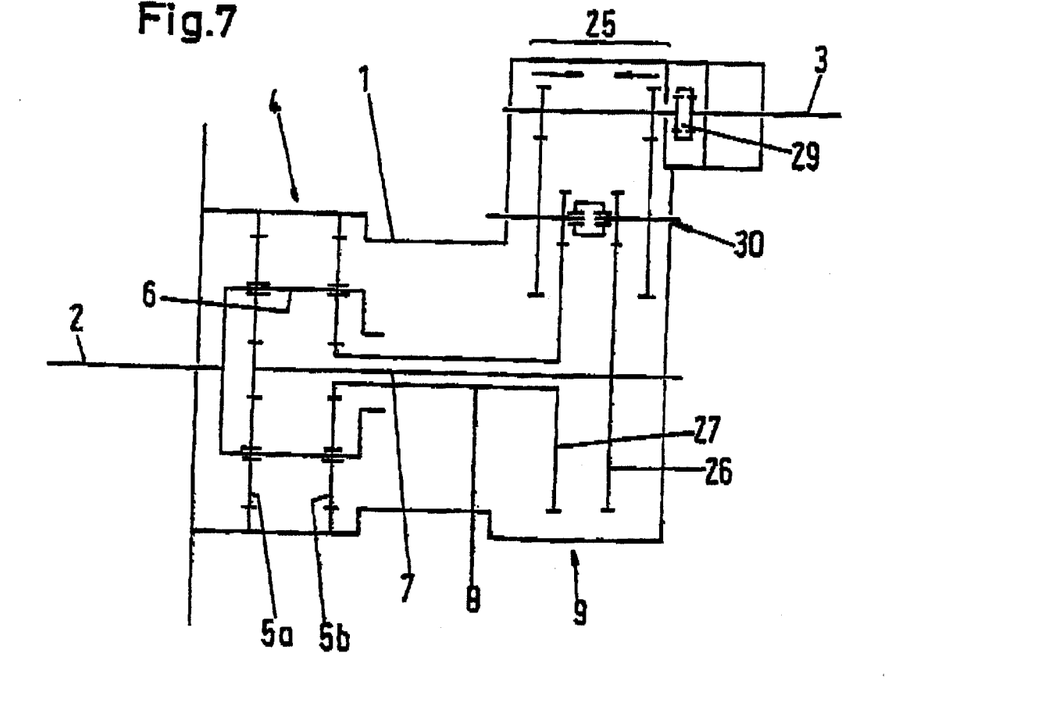
FIG. 7 is a modification of the embodiment of FIG. 6.

In a modification of the third embodiment depicted in FIG. 7, an additional spur gear stage 30 is arranged between the differential spur wheels 26 and 27 and the differential spur gear pair 25. The spur gear stage 30 is provided so as to further increase the total gear ratio of the gear.

The implementation of the invention is not limited to the three preferred embodiments and their modifications. Rather, various modifications are feasible which make use of the illustrated solution even when embodied in an entirely different way.

LIST OF REFERENCE NUMERALS 1 case
2 drive shaft, primary shaft
3 driven shaft, output shaft
4 planet stage
5 planetary gear
6 planet carrier
7 sun shaft
8 sun shaft, hollow
9 differential gear stage
10 spur gear stage
11 intermediate shaft
12 spur gear stage
13 spur wheels
14 spur wheels
15 intermediate shaft
16 sun wheel
17 hollow wheel
18 planet carrier
19 sun wheel
20 planet carrier
21 hollow wheel
22 sun wheel
23 hollow wheel
24 planet carrier
25 differential spur gear pair
26 differential spur gear
27 differential spur gear
28 spur wheel
29 coupling
30 spur gear stage

What is claimed is:

1. A transmission, in particular for wind power installations, comprising:
    a transmission case,
    an input shaft and an output shaft supported in the transmission case,
    an input-side planetary stage disposed between the input shaft and the output shaft and having at least two power-splitting planetary gears of equal dimensions and being connected in parallel, the planetary stage further comprising two sun shafts; and
    at least one passive differential gear stage implemented as a differential planetary gear and connected downstream of the planetary stage, said at least one differential gear stage including a sun wheel, a hollow wheel and a planet carrier, wherein one of the two sun shafts is operatively connected with the sun wheel of the differential gear stage and the other of the two sun shafts is operatively connected with the hollow wheel of the differential gear stage, and wherein the planet carrier of the differential gear stage forms an output section operatively connected to the output shaft.

2. The transmission of claim 1, wherein the planetary stage includes exactly two planetary gears that are connected in parallel and arranged sequentially.

3. The transmission of claim 1, the planetary stage further comprising a common planet carrier, wherein the planetary stage is connected with the input, shaft via the common planet carrier.

4. The transmission of claim 1, and further comprising a spur gear stage, wherein the output shaft is arranged with an axial offset relative to the drive shaft, said offset provided by the spur gear stage.

5. The transmission of claim 1, and further comprising an intermediate shaft and a spur wheel supported by the intermediate shaft and arranged between the input shaft and the output shaft.

6. The transmission of claim 1, wherein the passive differential gear stage is arranged coaxially with respect to the two sun shafts.

7. The transmission of claim 1, and further including an intermediate spur gear stage, wherein the, passive differential gear stage is arranged with an axial offset relative to the two sun shafts, said offset provided by the intermediate spur gear stage.

8. The transmission of claim 2, wherein the sun shaft of a first of the planetary gears together with the sun shaft of a second of the planetary gears form a coaxial hollow shaft arrangement.

9. The transmission of claim 7, wherein the intermediate spur gear stage includes two first spur wheels of identical diameter and arranged side-by-side, and two second spur wheels of identical diameter, with the first spur wheels being arranged coaxially with respect to the two sun shafts, and each of the first spur wheels being connected with a respective one of the two sun shafts, the first spur wheels engaging with the second spur wheels, the second spur wheels cooperating with the passive differential gear stage that is arranged coaxially with respect to the corresponding second spur wheels.

10. A transmission, in particular for wind power installations, comprising:
   a transmission case;
   an input shaft and an output shaft supported in the transmission case;
   an input-side planetary stage disposed between the input shaft and the output shaft and having at least two power-splitting planetary gears of equal dimensions and being connected in parallel, the planetary stage further comprising two sun shafts; and
   at least one active differential gear stage having a sun wheel and implemented as a differential planetary gear which, on one hand, splits the power equally between the two sun shafts connected to the differential gear stage and, on the other hand, contributes to an overall gear ratio of the transmission through an asymmetric connection of the planetary stage, whereby the sun wheel forms an output section operatively connected to the output shaft.

11. The transmission of claim 10, wherein the planetary stage includes exactly two planetary gears that are connected in parallel and arranged sequentially.

12. The transmission of claim 10, and further comprising a spur gear stage, wherein the output shaft is arranged with an axial offset relative to the drive shaft, said offset provided by the spur gear stage.

13. The transmission of claim 10, and further comprising at least one spur gear stage being connected downstream of the differential gear stage.

14. The transmission of claim 10, wherein each of the two planetary gears includes a planet carrier, a sun wheel and a hollow wheel, and wherein the asymmetric connection between the planetary stage and the differential gear stage is implemented in that on a first of the two planetary gears disposed on an input side of the planetary stage, the hollow wheel is grouped with the planet carrier which is secured to the transmission case and with the sun wheel which is located on the output-side of the planetary stage, and on the second planetary gear disposed on the input side of the planetary stage, the planet carrier is grouped with the hollow wheel which is secured to the transmission case and with the sun wheel which is located on the output side of the planetary stage, whereby the sun wheel of the first planetary gear is operatively connected to the hollow wheel of the differential gear stage and the sun wheel of the second planetary gear is operatively connected to the planet carrier of the differential gear stage.

15. A transmission, in particular for wind power installations, comprising:
   a transmission case;
   an input shaft and an output shaft supported in the transmission case;
   an input-side planetary stage disposed between the input shaft and the output shaft and having at least two power-splitting planetary gears of equal dimensions and being connected in parallel, the planetary stage further comprising two sun shafts; and
   at least one active differential gear stage implemented as a differential spur gear pair with opposing helical gears that is softly supported in the axial direction, the differential spur gear pair further including two differential spur wheels, wherein the differential spur gear pair splits the load equally between the two connected sun shafts and contributes to a total gear ratio of the transmission, and wherein one of the two sun shafts is operatively connected with one of the differential spur wheels and the other sun shaft is operatively connected with the other differential spur wheel.

16. The transmission of claim 15, wherein the planetary stage includes exactly two planetary gears that are connected in parallel and arranged sequentially.

17. The transmission of claim 15, wherein the planetary stage includes a common planet carrier and is connected with the input shaft via the common planet carrier.

18. The transmission of claim 15, further comprising an axially soft coupling arranged coaxially between the differential spur gear pair and a coaxial spur wheel disposed on an output side of the differential gear stage, said coupling providing the axially soft support of the differential spur gear pair.

19. The transmission of claim 15, wherein the differential spur gear pair and the corresponding differential spur wheels that each are connected with a respective one of the two sun shafts provide a geared-up transmission ratio with respect to one another.

20. The transmission of claim 16, wherein the sun shaft of a first of the planetary gears together with the sun shaft of a second of the planetary gears form a coaxial hollow shaft arrangement.

21. The transmission of claim 19, and further comprising an additional spur gear stage disposed between the differential spur wheels and the differential spur gear pair, said additional spur gear stage providing a geared-up transmission ratio.

22. A transmission in particular for wind power installations comprising:
   a transmission case;
   an input shaft and an output shaft supported in the transmission case;
   an input-side planetary stage disposed between the input shaft and the output shaft and having at least two power-splitting planetary gears of equal dimensions and being connected in parallel, at least one active differential gear stage connected downstream of the power-splitting planetary gears for equalizing an uneven load distribution between each of the parallel connected power-splitting planetary gears.

* * * * *

UNITED STATES PATENT AND TRADEMARK OFFICE
CERTIFICATE OF CORRECTION

PATENT NO. : 6,607,464 B1
DATED : August 19, 2003
INVENTOR(S) : Bauer et al.

It is certified that error appears in the above-identified patent and that said Letters Patent is hereby corrected as shown below:

<u>Column 3,</u>
Line 11, "embodiment, While" should read -- embodiment, while --

<u>Column 4,</u>
Line 46, "sun shaft 8" should read -- sun shaft 7 --
Line 49, "7 is connected" should read -- 8 is connected --

<u>Column 5,</u>
Line 5, "up by 1/5" should read -- up by i/5 --

Signed and Sealed this

Third Day of February, 2004

JON W. DUDAS
*Acting Director of the United States Patent and Trademark Office*